US009435430B2

(12) United States Patent
Shultz et al.

(10) Patent No.: US 9,435,430 B2
(45) Date of Patent: Sep. 6, 2016

(54) CONTROL FOR MANAGING ACTUATOR OUTPUT PRESSURE APPLIED TO A TORQUE TRANSMITTING MECHANISM OF A MULTI-SPEED TRANSMISSION

(71) Applicant: Allison Transmission, Inc., Indianapolis, IN (US)

(72) Inventors: Jeff Shultz, Zionsville, IN (US); Peter Swingler, Carmel, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 14/685,147

(22) Filed: Apr. 13, 2015

(65) Prior Publication Data

US 2015/0211629 A1 Jul. 30, 2015

Related U.S. Application Data (60) Continuation of application No. 13/662,690, filed on Oct. 29, 2012, now Pat. No. 9,026,329, which is a division of application No. 12/167,637, filed on Jul. 3, 2008, now Pat. No. 8,301,347.

(51) Int. Cl.
*F16H 41/26* (2006.01)
*F16H 45/02* (2006.01)
*B60W 30/19* (2012.01)
*F16H 61/06* (2006.01)
*F16H 61/16* (2006.01)

(52) U.S. Cl.
CPC ............ *F16H 61/061* (2013.01); *F16H 61/16* (2013.01); *F16H 2061/062* (2013.01)

(58) Field of Classification Search
CPC .... F16H 41/26; F16H 45/02; F16H 61/0267; F16H 61/061; B60W 30/19
USPC ............. 192/3.22; 477/126, 169; 701/51, 58
See application file for complete search history.

(56) References Cited

U.S. PATENT DOCUMENTS

| | | | |
|---|---|---|---|
| 3,592,083 A * | 7/1971 | Kawabata | ........... F16H 61/0267 137/805 |
| 4,070,927 A | 1/1978 | Polak | |
| 4,720,003 A * | 1/1988 | Murasugi | ................ F16H 45/02 192/3.3 |
| 4,805,490 A | 2/1989 | Fuehrer et al. | |
| 5,113,343 A | 5/1992 | Hunter et al. | |
| 5,601,506 A | 2/1997 | Long et al. | |
| 5,679,095 A | 10/1997 | Sekine et al. | |
| 5,685,408 A | 11/1997 | Long | |
| 5,857,162 A | 1/1999 | Vukovich et al. | |
| 6,295,498 B1 | 9/2001 | Gleason et al. | |
| 6,319,164 B1 | 11/2001 | Runde et al. | |
| 6,585,617 B1 | 7/2003 | Moorman et al. | |
| 7,510,496 B2 | 3/2009 | Long et al. | |
| 7,869,924 B2 | 1/2011 | Wu et al. | |
| 8,301,347 B2 | 10/2012 | Shultz et al. | |
| 9,026,329 B2 | 5/2015 | Shultz | |
| 2004/0249540 A1* | 12/2004 | Saitou | ................... B60W 30/19 701/51 |
| 2007/0179019 A1 | 8/2007 | Hagelskamp et al. | |
| 2007/0281816 A1 | 12/2007 | Long et al. | |
| 2008/0176700 A1 | 7/2008 | Long et al. | |
| 2009/0071777 A1 | 3/2009 | Weber et al. | |

(Continued)

*Primary Examiner* — Yuri Kan
(74) *Attorney, Agent, or Firm* — Barnes & Thornburg LLP (57) ABSTRACT

A method for managing torque transmitting mechanism actuator output pressure under low supply pressure conditions is provided. The method is executable to control engagement of a torque transmitting mechanism during such conditions.

19 Claims, 5 Drawing Sheets

(56) References Cited

U.S. PATENT DOCUMENTS

2009/0071785 A1* 3/2009 Heeke .................... F16H 41/26
　　　　　　　　　　　　　　　　　　　192/3.22
2009/0075772 A1　3/2009　Ellis et al.
2009/0253552 A1　10/2009　Foster
2009/0272616 A1　11/2009　Wilson et al.
2012/0073398 A1　3/2012　Long et al.

* cited by examiner

CONTROL FOR MANAGING ACTUATOR OUTPUT PRESSURE APPLIED TO A TORQUE TRANSMITTING MECHANISM OF A MULTI-SPEED TRANSMISSION

CROSS-REFERENCE TO RELATED APPLICATION

This application is a continuation application of U.S. application Ser. No. 13/662,690 entitled "CONTROL FOR MANAGING ACTUATOR OUTPUT PRESSURE APPLIED TO A TORQUE TRANSMITTING MECHANISM OF A MULTI-SPEED TRANSMISSION," which was filed on Oct. 29, 2012, and which is a divisional application of and claims priority to U.S. application Ser. No. 12/167,637, now U.S. Pat. No. 8,301,347, which was filed on Jul. 3, 2008. The entirety of each of those applications is incorporated herein by reference.

BACKGROUND

Automatic transmissions generally include a plurality of torque transmitting mechanisms, such as clutches, brakes, or the like, which are selectively engageable and disengageable to change the operating mode, range or gear ratio of the transmission. The engagement and disengagement of the torque transmitting mechanisms are typically controlled by a control system that has electronic and hydraulic components.

In the control system, an electronic control issues signals to one or more electro-hydraulic actuators. The electro-hydraulic actuators also receive pressurized hydraulic transmission fluid from a fluid supply. The electro-hydraulic actuators output fluid pressure in accordance with control signals received from the electronic control and the supplied pressure. The actuators supply output pressure to fluid chambers of the respective torque transmitting mechanisms, either directly through a fluid passage or via a pressure regulating valve assembly.

There are a variety of different types of electro-hydraulic actuators that may be used to control the engagement and disengagement of the torque transmitting mechanisms, including on/off solenoids, pulse-width modulated (PWM) solenoids, and variable-bleed solenoids (VBSs).

SUMMARY

This disclosure describes methods and systems for controlling actuator output pressure applied to a torque transmitting mechanism.

In one embodiment of the present invention, a control for a torque transmitting mechanism of a vehicle transmission is provided. The control includes a supply of hydraulic transmission fluid, and an electro-hydraulic actuator in fluid communication with the fluid supply, where the electro-hydraulic actuator is configured to provide an output pressure to a torque transmitting mechanism of a vehicle transmission. The control also includes an electronic control configured to detect a trim phase of the torque transmitting mechanism. During the trim phase, the electronic control sends a first pressure command to the electro-hydraulic actuator when the fluid supply supplies fluid to the electro-hydraulic actuator at a first pressure, sends a second pressure command to the electro-hydraulic actuator when the fluid supply supplies fluid to the electro-hydraulic actuator at a second pressure, and sends a third pressure command to the electro-hydraulic actuator when the fluid supply supplies fluid to the electro-hydraulic actuator at a third pressure.

The electro-hydraulic actuator may be a closed-end, variable bleed solenoid valve. The second and third pressures supplied by the fluid supply to the electro-hydraulic actuator may be less than the first pressure supplied by the fluid supply to the electro-hydraulic actuator. The first pressure command may command a trim pressure. The second pressure command may be a "pressure off" command. The third pressure command may be a "pressure on" command. The pressure off command may command zero pressure and the pressure on command may command a pressure equal to the trim pressure modified by an offset. The electronic control may continuously repeat the second and third pressure commands until a predetermined amount of time has elapsed or a transmission input speed of the vehicle transmission is greater than or equal to a transmission input speed threshold.

According to another embodiment of the present invention, an electronic control for a vehicle transmission is provided. The electronic control is embodied in a tangible medium. The electronic control manages fluid pressure provided to a torque transmitting mechanism. The electronic control includes a shift scheduler configured to initiate a shift of a vehicle transmission from a first operational mode to a second operational mode, a torque transmitting mechanism control configured to receive a shift command from the shift scheduler and issue a first pressure command to control application or release of at least one torque transmitting mechanism of the transmission, and a pressure command modifier configured to detect a trim phase of the at least one torque transmitting mechanism and provide alternating second and third pressure commands during the trim phase.

The first operational mode may be a second forward ratio and the second operational mode may be a first forward ratio. The torque transmitting mechanism control may be configured to issue the first pressure command after completion of a fill phase of torque transmitting mechanism control. The pressure command modifier may be configured to issue the second and third pressure commands in response to a change in a transmission input speed of the vehicle. The pressure command modifier may initiate the second and third pressure commands if a condition is met. The condition may include a transmission input speed being less than a predetermined transmission input speed threshold. The condition may include a fluid temperature being greater than a predetermined fluid temperature threshold.

The first pressure command may command a trim pressure, the second pressure command may command a zero pressure, and the third pressure command may command a pressure that is greater than the first pressure command. The second pressure command may be less than the first pressure command and the second pressure command may be less than the third pressure command.

According to another embodiment of the present invention, a method of controlling torque transmitting mechanism actuator output pressure is provided. The method includes receiving an indicator of a transmission input speed of a vehicle, receiving an indicator of a temperature of a hydraulic fluid of an electro-hydraulic control operably coupled to the vehicle transmission, issuing a first pressure command if the transmission input speed indicator is greater than a threshold transmission input speed, and issuing repeating second and third pressure commands while the transmission input speed indicator is less then the threshold transmission input speed and the temperature indicator is greater than a threshold temperature.

The method may include determining that a shift has been commanded and determining that a trim phase of the shift has been initiated prior to issuing the second and third pressure commands. The method may include discontinuing the second and third pressure commands if the trim phase of the shift has ended.

Patentable subject matter may include one or more features or combinations of features shown or described anywhere in this disclosure including the written description, drawings, and claims.

BRIEF DESCRIPTION OF THE DRAWINGS

The detailed description refers to the following figures in which.

DETAILED DESCRIPTION

One type of actuator that may be used to control engagement and disengagement of torque transmitting mechanisms in a vehicle transmission is a closed-end variable-bleed solenoid. Closed-end variable bleed solenoids and similar devices normally require a constant or substantially constant supply pressure for proper operation.

The supply pressure to such actuators may be reduced under certain operating conditions, such as when the vehicle transmission input speed decreases and the temperature of the hydraulic transmission fluid increases. Under such conditions, the actuator performance may destabilize. For example, with closed-end variable bleed solenoids, reductions in supply pressure to the solenoid may cause the solenoid's output pressure to increase to a point that it becomes noticeable to the vehicle operator during shifting.

Possible techniques for stabilizing the actuator performance during low supply pressure conditions include altering the size or tolerances of the fluid supply, or using a different type of solenoid. These alternatives would require costly hardware changes. In addition, replacing the closed-end variable bleed solenoid with another type of solenoid may introduce new problems. For example, if the closed-end variable bleed solenoid is replaced with an open-ended variable bleed solenoid, then leakage problems will likely need to be addressed.

The present invention provides a reliable, cost-effective solution to actuator output pressure stability problems that may result from supply pressure variations. Aspects of the present invention are described with reference to certain illustrative embodiments shown in the accompanying drawings and described herein. While the present invention is described with reference to the illustrative embodiments, it should be understood that the present invention as claimed is not limited to the disclosed embodiments.

Figure 1:
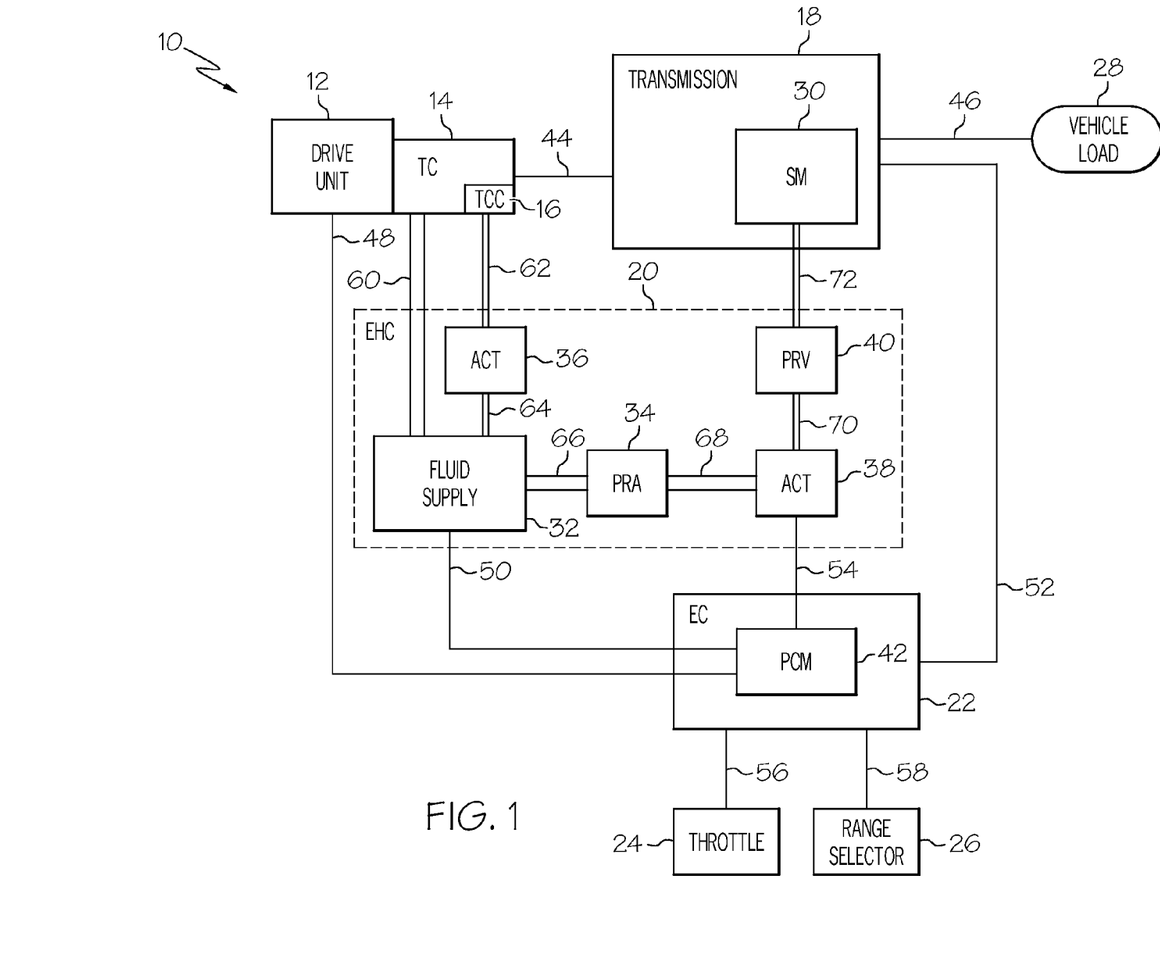
FIG. 1 is a simplified block diagram of a vehicle powertrain, including a transmission having at least one torque transmitting mechanism, an electro-hydraulic control including at least one actuator operably coupled to the at least one torque transmitting mechanism, and an electronic control configured to manage actuator output pressure.

This disclosure describes the present invention in the context of an exemplary vehicle powertrain 10, shown in FIG. 1. Powertrain 10 includes a drive unit 12, at least one torque transmitting mechanism 16, 30, an electro-hydraulic control 20 including at least one actuator 36, 38 operably coupled to the at least one torque transmitting mechanism 16, 30, and an electrical or electronic control 22 operably coupled to the electro-hydraulic control 20. It will be understood by those skilled in the art that aspects of the present invention are applicable to other types of powertrains and other systems in which an electro-hydraulic actuator provides fluid pressure to a torque transmitting mechanism.

Each of the schematic linkages 44, 46, 48, 50, 52, 54, 56, 58, 60, 62, 64, 66, 68, 70, 72 shown in FIG. 1 may in practice include one or more physical or logical structures to accomplish the described connections, linkages, conduits, and the like, as will be understood by those skilled in the art. In general, linkages 44, 46 include mechanical and/or fluid couplings, linkages 48, 50, 52, 54, 56, 58 include electronic or electrical connections or conduits, and linkages 60, 62, 64, 66, 68, 70, 72 include fluid connections, which may involve one or more fluid passages or conduits.

In powertrain 10, drive unit 12 provides a torque output to torque transferring apparatus 14. Drive unit 12 may be an internal combustion engine of a compression-ignition type (i.e. diesel) or a spark-ignition type (i.e. gasoline), or the like. In other embodiments, drive unit 12 may be of a hybrid type, including, for example, an engine and one or more electric motors. In any event, signals indicative of the drive unit speed, referred to herein as the transmission input speed, are provided to electrical control 22 via a link such as link 48. In the illustrated embodiment, drive unit 12 is an engine, the engine speed is the transmission input speed, and the engine speed is measured by a speed sensor positioned on transmission 18.

Torque transferring apparatus 14 selectively establishes a mechanical or fluid coupling 44 between drive unit 12 and transmission 18 to convert and/or transfer torque output from drive unit 12 to the vehicle transmission 18. In the illustrated embodiment, torque transferring apparatus 14 is a torque converter. As known by those of ordinary skill in the art, a torque converter generally includes a pump coupled to a drive unit output shaft, a turbine coupled to a transmission input shaft, and a stator interposed between the pump and the turbine. Electronic control 22 monitors turbine speed for a variety of purposes, including, but not limited to, determining when a torque transmitting mechanism such as a clutch is completely engaged, thus indicating completion of a shift.

Torque transferring apparatus 14 may include one or more selectively engageable and disengageable couplers, such as a torque converter clutch and/or a pump clutch, which may be configured to alter the coupling between drive unit 12 and transmission 18. A torque converter clutch (also known as a "lockup" clutch) is often provided to effect unitary rotation of the torque converter pump and turbine in response to reduced hydraulic pressure within the torque converter, which may occur when "slip" (i.e., a difference in rotational speed) between the torque converter pump and turbine is not required. In the illustrated embodiment, torque transmitting mechanism 16 is a torque converter clutch. Torque transferring apparatus 14 and torque converter clutch 16 are in fluid communication with the electro-hydraulic control 20 via fluid connections 60, 62, respectively.

Torque transferring apparatus 14 communicates drive unit output torque to transmission 18 via linkage 44. In general, transmission 18 includes a plurality of inter-connected planetary gearsets that are driven by a plurality of selectively engageable shift mechanisms 30. One example of such a transmission is described in Polak, U.S. Pat. No. 4,070,927, which is incorporated herein by this reference. The exemplary transmission has three inter-connected planetary gearsets and five shift mechanisms, which are controllable to provide six forward speed ratios, reverse and neutral. In the exemplary transmission of Polak, each of the forward speed ratios and the reverse ratio are achieved by engaging two shift mechanisms, while the neutral mode is achieved by engaging only one shift mechanism.

It will be understood by those of ordinary skill in the art that the above-mentioned transmission is offered as an example for illustrative purposes, and that aspects of the present invention are applicable to other types and configurations of multi-speed transmissions.

Transmission 18 is operably coupled to and drives a vehicle load 28 via linkage 46. Vehicle load 28 generally includes the drive wheels and driven load mass. The actual weight of vehicle load 28 may be quite considerable and/or vary considerably over the course of the vehicle's use, as may be the case with commercial vehicles such as trucks, buses, emergency vehicles, and the like.

A vehicle throttle 24 and a vehicle range selector 26 are operably coupled to transmission 18 via electronic control 22 and electro-hydraulic control 20. Throttle 24 provides signals indicative of throttle position, i.e., open or closed, to electrical control 22, via link 56. Range selector 26 issues signals or commands indicative of a selected or desired operational mode or range of the vehicle, i.e., a selected or desired forward speed ratio, reverse, or neutral, to electrical control 22, via link 58. Range selector 26 may be either an electronically-controlled or "fly-by-wire" range selecting mechanism, or a manual valve selector as known in the art. Either or both of the throttle position and the operational mode, range, or ratio may be selected manually by a vehicle operator, e.g. by depressing a pedal, moving a lever or pressing a button. Either or both of the throttle position and operational range, mode or ratio may alternatively or in addition be automatically selected by electronic control 22, such as while the vehicle is operating in a "drive" mode or a "cruise control" mode.

The torque transmitting mechanisms 16, 30 are selectively engaged and disengaged by the electro-hydraulic control 20 according to commands received from electronic control 22. In particular, shifting from one range, ratio or mode to another range, ratio or mode in the transmission is generally accomplished by disengaging or releasing one shift mechanism 30 while engaging or applying another shift mechanism 30. Also during shifting, the torque converter clutch 16 may be selectively engaged or disengaged. For example, the torque converter clutch 16 may be engaged in higher forward ratios and disengaged in lower forward ratios, reverse and neutral. However, it is also possible to engage or disengage the torque converter clutch 16 in any of the forward ratios.

The shift mechanisms 30 and torque converter clutch 16 are configured to selectively achieve a mechanical, fluid or friction coupling between components of the powertrain 10 in response to various conditions or changes in conditions. As such, the term "torque transmitting mechanism" may be used herein to refer individually or collectively to shift mechanisms 30 or the torque converter clutch 16. The torque transmitting mechanisms 16, 30 may be friction devices or fluid-operated devices such as clutch- or brake-type devices, and may be stationary- or rotating-type devices. Torque transmitting mechanisms 16, 30 may be operated independently of each other. For instance, any combination of torque transmitting mechanisms 16, 30 may be engaged and disengaged at a given time.

In this disclosure, the term "shift mechanism" may be used to refer more particularly to one or more torque transmitting mechanisms that are configured to cause the transmission to switch from one operational mode, range or gear ratio to another, different mode, range or gear ratio.

The torque transmitting mechanisms 16, 30 each have a fillable and depletable fluid chamber that is in fluid communication with hydraulic control elements of electro-hydraulic control 20 via fluid connections 62, 72, respectively.

In general, electro-hydraulic control 20 includes a fluid supply 32, a pressure regulating apparatus 34, and one or more actuators 36, 38, which selectively convey pressurized fluid to torque transmitting mechanisms 16, 30. Electro-hydraulic control 20 may also include one or more pressure regulating valves 40, such as trim valves, relay or logic or shift valves, or a combination thereof, which are in fluid communication with the one or more actuators 36, 38 and the one or more torque transmitting mechanisms 16, 30.

An example of such an electro-hydraulic control system is described in Long et al., U.S. Pat. No. 5,601,506; Long et al., which is incorporated herein by this reference. However, it will be understood by those of ordinary skill in the art that the above-mentioned control system is offered as an example for illustrative purposes, and that aspects of the present invention are applicable to other types and configurations of electro-hydraulic controls for multi-speed transmissions.

Fluid supply 32 provides pressurized transmission fluid to the hydraulic portion of electro-hydraulic control 20. As such, fluid supply 32 generally includes a pump, a sump or reservoir, and a main pressure regulating apparatus (not shown), which supplies pressurized fluid to components of the hydraulic portion of the control system 20 at a "main" pressure.

The main pressure supplied by fluid supply 32 is generally a function of transmission input speed and other factors. When transmission input speed decreases, main pressure decreases. The main pressure is also affected by the temperature of the hydraulic fluid, such that if the fluid temperature is too high, the change in viscosity of the fluid may affect the fluid pressure.

In the illustrated embodiment, main pressure is supplied to torque converter 14 and pressure regulating apparatus 34 via fluid connections 60, 66, respectively. Main pressure is also supplied to actuator 36 via fluid connection 64. Thus, the supply pressure for actuator 36 is the main pressure. Actuator 36 selectively provides output pressure to torque converter clutch 16 via fluid connection 62 based on signals from electronic control 22. In this way, actuator 36 controls engagement and disengagement of torque converter clutch 16.

Main pressure may vary within a wide range. Pressure regulating apparatus 34 regulates the main pressure to provide a more stable pressure supply. Pressure regulating apparatus 34 generally includes at least one pressure regulating valve. The fluid pressure provided by pressure regulating apparatus 34 may be referred to as the "control" pressure. In general, the control pressure is less than the maximum main pressure.

Control pressure is supplied to actuator 38 via fluid connection 68. Thus, the supply pressure for actuator 38 is the control pressure. Actuator 38 selectively provides output pressure to shift mechanism 30 via pressure regulating valve 40 and fluid connections 70, 72, based on signals from electronic control 22. Pressure regulating valve 40 includes at least one trim valve, shift, relay or logic valve, or a combination thereof. In this way, actuator 38 controls engagement and disengagement of shift mechanism 30. Other shift mechanisms of a multi-speed transmission are controlled by actuators and pressure regulating valves in a similar manner.

Actuators 36, 38 are solenoid valves or similar devices that convert a supply pressure into output fluid pressure based on the presence or absence of electrical input. Actuators 36, 38 are either of the normally low type or of the normally high type. A normally low (or normally off) solenoid valve provides maximum output pressure when it receives electrical input and provides zero or minimum output pressure when no electrical input is received; while a normally high (or normally on) solenoid valve provides maximum output pressure when it is not receiving any electrical input and provides zero or minimum output pressure when electrical input is provided.

Thus, as used herein, when referring to an actuator or solenoid valve as being "actuated," this means either that electrical input is supplied to the solenoid (as in the case of normally low solenoids) or that electrical input is not supplied to the solenoid (as in the case of normally high solenoids).

In the illustrated embodiment, at least one of actuators 36, 38 is a closed end variable bleed solenoid valve. More particularly, at least actuator 38 is a closed end variable bleed solenoid. An example of such a valve is the Bosch D26 closed end normally low variable bleed solenoid. However, aspects of the present invention are applicable to any type of closed end variable bleed solenoid valve or similar device that does not leak fluid when the solenoid is in the off state, including normally high closed end variable bleed solenoids.

In general, electrical control 22 controls operation of transmission 18 based on inputs from one or more components of drive unit 12, torque converter 14, transmission 18, throttle 24, range selector 26; and/or other inputs. Such inputs may include electrical and/or analog signals received from sensors, controls or other like devices associated with the vehicle components. For instance, inputs may include signals indicative of transmission input speed, driver requested torque, engine output torque, temperature of the hydraulic fluid, transmission output speed, turbine speed, brake position, gear ratio, torque converter slip, and/or other measurable parameters.

Electrical control 22 generally includes electrical circuitry configured to process, analyze or evaluate one or more inputs and issue electrical control signals to electro-hydraulic control system 20, as needed, through one or more electrical lines, conductors, or other suitable connections or links. Such connections may include hard-wired and/or networked components in any suitable configuration including, for example, insulated wiring and/or wireless transmission as may be appropriate or desired.

Electrical circuitry of control 22 includes computer circuitry such as one or more microprocessors, integrated circuits and related elements configured to process executable instructions expressed in computer programming code or logic, which is stored in one or more tangible media, i.e., any suitable form of memory or storage media that is accessible or readable by the processor or processors. Control 22 may also include analog to digital converters and/or other signal processing circuitry or devices as needed to process one or more of the inputs received from the vehicle components.

While shown schematically in FIG. 1 as a single block 22, it will be understood by those skilled in the art that portions of control 22 may be implemented as separate logical or physical structures. For example, electronic controls for transmission 18 may be physically and/or logically separated from electronic controls for drive unit 12.

Electronic control 22 generally includes a plurality of control modules, including a pressure command modifier module 42. Pressure command modifier module 42 and other control modules described herein include electrical circuitry and may include one or more microprocessors, controllers, microcontrollers, and communications interfaces (such as a port, bus and/or network interface), as well as tangible media (such as computer memory or storage media in any suitable form including ROM, RAM, compact flash, memory sticks, memory cards, optical storage media such as CD-ROMs, and the like) for storing, temporarily or permanently as needed, data, tables, charts, graphs, input, computed or derived values, programs, processes, logs, executable instructions, calculations, software, and the like, which are part of the computer programs, processes and operations of the control module. For example, executable instructions implementing the pressure command modifier 42 may be written using the 'C' programming language and stored in nonvolatile memory of control 22.

Figure 2:
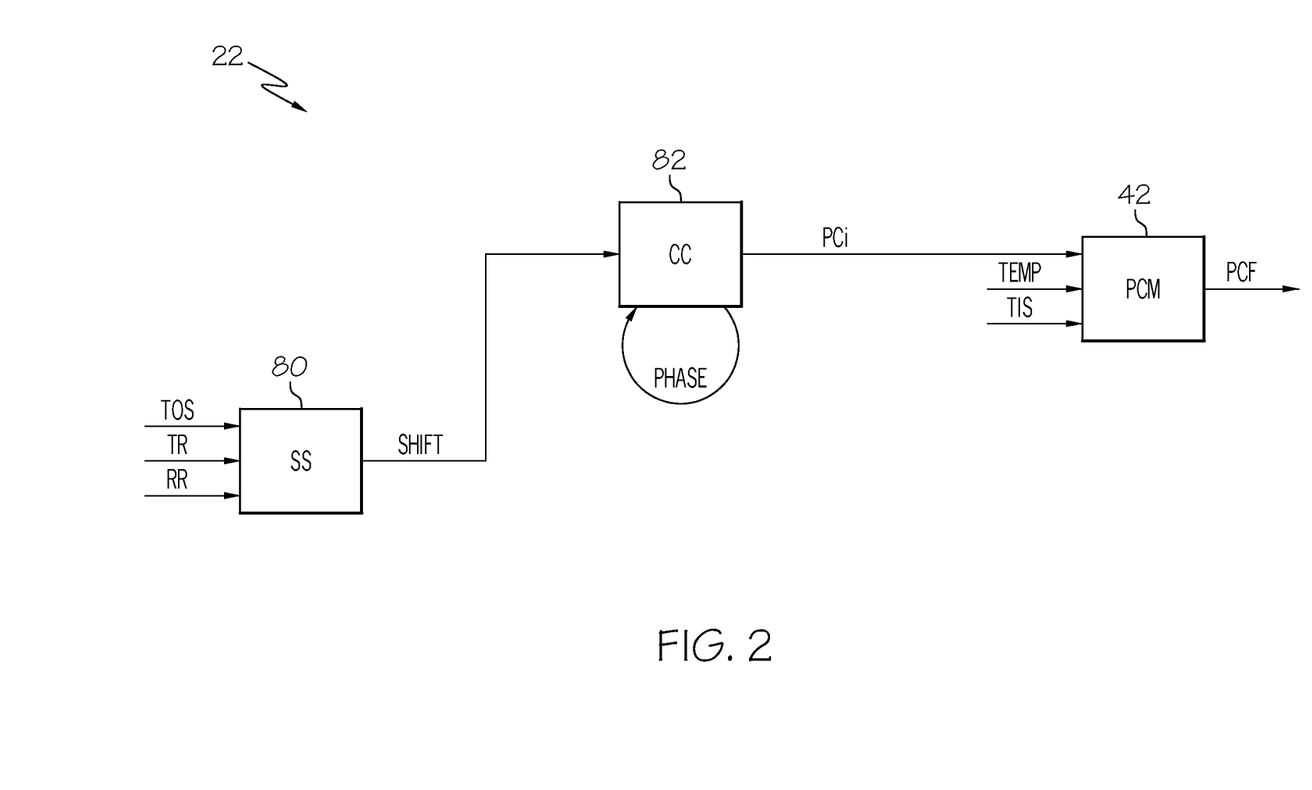
FIG. 2 is a simplified block diagram of one embodiment of an electronic control for a torque transmitting mechanism of a vehicle transmission, configured to manage actuator output pressure.

The embodiment of control 22 shown in FIG. 2 includes a shift scheduler module 80, a clutch control module 82 and pressure command modifier module 42. In general, shift scheduler 80 determines when an upshift, downshift, or range change is needed, based on a variety of inputs that it continuously monitors. Shift scheduler 80 receives inputs including transmission output speed (TOS), torque requests (TR), which may originate from throttle 24; and mode, range or ratio change requests (RR), which may originate from range selector 26. Based on one or more of these inputs, and other factors as needed, shift scheduler 80 determines whether a shift is needed.

In the illustrated embodiment, shift scheduler 80 monitors transmission input speed, transmission output speed, throttle status (i.e. open or closed), and the current gear or speed ratio (i.e., an indicator of whether the transmission is in $1^{st}$, $2^{nd}$, $3^{rd}$, etc. forward ratio, neutral, or reverse). One or more computerized lookup table(s) or other suitable software data structures or facilities stored in memory are used to determine, based on the current state of these variables, whether to start a shift. For example, if shift scheduler 80 determines that the throttle is closed, the transmission is in the $2^{nd}$ forward ratio, and the transmission output speed is less than a predetermined transmission output speed threshold, then shift scheduler 80 may, as a result of executing programming logic, conclude that a shift should be initiated.

If a shift is needed, shift scheduler 80 sends a "shift" signal or instructions to clutch control module 82, or otherwise initiates clutch control module 82 to start a shift. Clutch control 82 initializes variables as needed to accomplish the requested shift, including a shift timer and a shift flag. The shift timer starts a clock at the beginning of the shift and is used to sequence clutch control processes. Clutch control 82 monitors the status of the shift and if the shift is not completed after a pre-determined amount of elapsed time, clutch control 82 may cancel or end the shift.

At least one torque transmitting mechanism 16, 30 is applied or released during each shift. To accomplish application or release of a torque transmitting mechanism 16, 30, clutch control 82 sends a signal indicative of a command pressure to an actuator 36, 38. The command pressure is the fluid pressure that clutch control 82 determines, by execution of programming logic of control 22, is required to be output by the appropriate actuator 36, 38 to accomplish the desired action of the torque transmitting mechanism 16, 30 to be engaged or disengaged. Actuator 36, 38 provides an output pressure to the torque transmitting mechanism 16, 30 in accordance with the pressure command and the supply pressure provided to the actuator 16, 30, as shown in FIGS. 4 and 5.

Application of a torque transmitting mechanism 16, 30 typically includes three phases: a fill phase, a trim phase, and an apply phase. During the fill phase, a fluid chamber of the on-coming torque transmitting mechanism 16, 30 is filled to a predetermined value with hydraulic fluid in preparation for engagement. Completion of the fill phase is detected by clutch control 82. In the illustrated embodiment, clutch control 82 determines that the fill phase has ended when a predetermined amount of time has elapsed on the shift timer, after which it is known that the fill phase has completed.

Once the fill phase is complete, a trim phase is initiated where the commanded pressure is lowered to an intermediate value to allow more precise control of pressure provided to the fluid chamber of the torque transmitting mechanism 16, 30. Completion of the trim phase is detected by clutch control 82. In the illustrated embodiment, clutch control 82 determines that the trim phase has ended when a predetermined amount of time has elapsed on the shift timer, after which it is known that the trim phase has completed, or when transmission input speed has reached a threshold calculated by clutch control module 82 based on transmission output speed and the gear ratio of the on-coming range. Thereafter, the apply phase begins wherein clutch control 82 commands maximum pressure, allowing full engagement of the torque transmitting mechanism 16, 30. Clutch control 82 continues to monitor transmission output speed, gear ratio, and turbine speed to determine when to end the shift.

Figure 4:
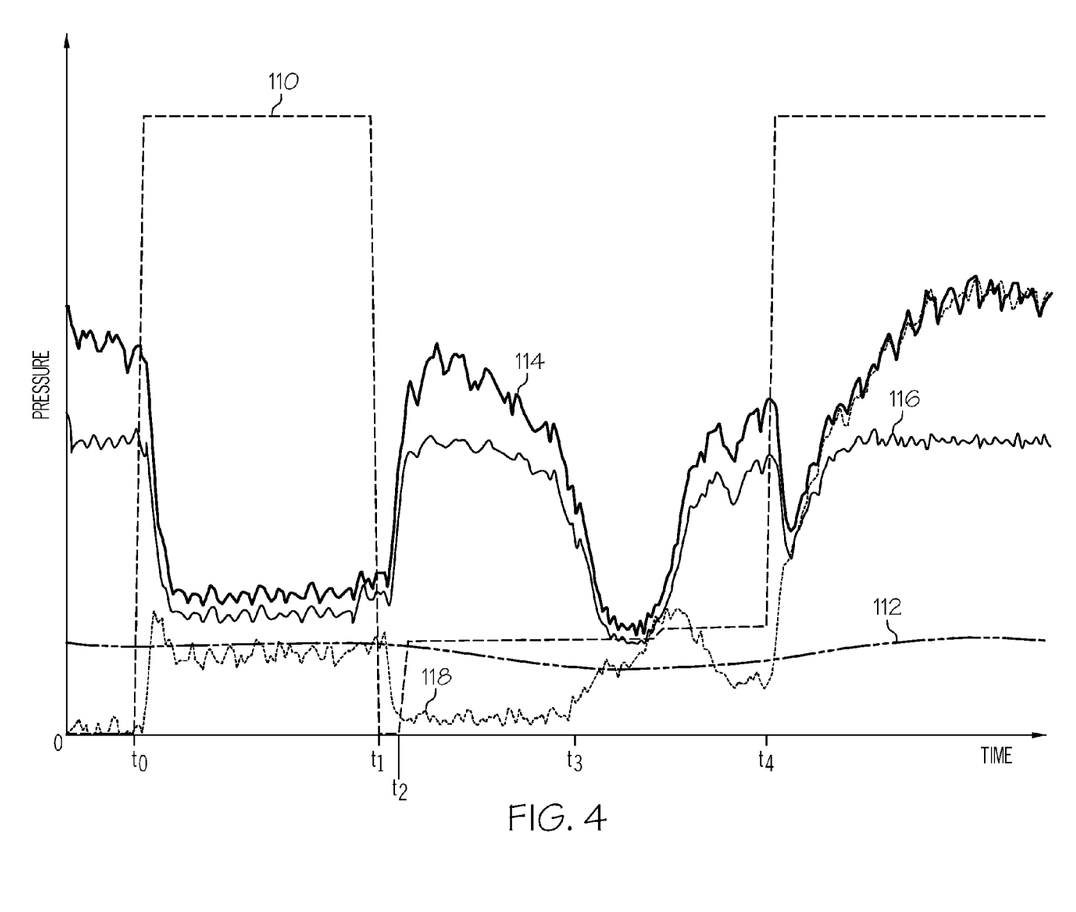
FIG. 4 is a graph illustrating an example of an actuator's response to a decrease in supply pressure without actuator output pressure control.
Figure 5:
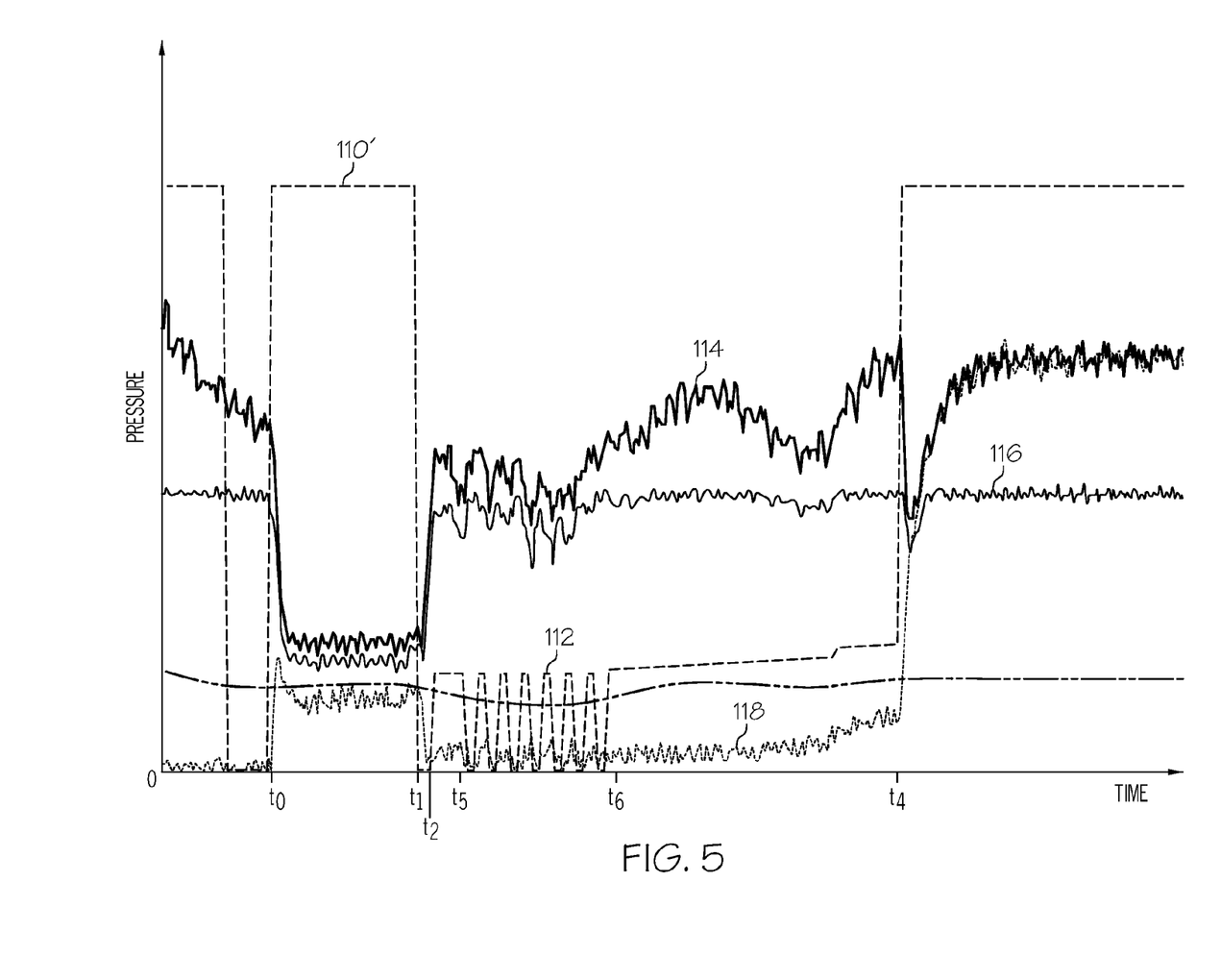
FIG. 5 is a graph illustrating an example of an actuator's response to a decrease in supply pressure when actuator output pressure control is provided in accordance with the present invention.

An example of pressure changes occurring during the phases of torque transmitting mechanism application over time are illustrated by the graph of FIG. 4. The curve 110 represents the pressure commands issued by electronic control 22 to actuator 38, which is configured to control a torque transmitting mechanism 30. The curve 112 represents the drive unit speed or transmission input speed. Curve 114 illustrates the main pressure within the fluid connections 60, 64, 66 of FIG. 1. The curve 116 represents the control pressure exiting pressure regulating apparatus 34 and being supplied to actuator 38 via fluid connection 68. Curve 118 represents the actuator output pressure or the fluid pressure provided to the on-coming torque transmitting mechanism 30.

For simplicity, the illustrated embodiment explains the operation of pressure command modifier 42 in the context of an actuator 38 controlling application of a torque transmitting mechanism 30. However, it will be understood by those of skill in the art that aspects of the present invention are also applicable to the control of torque transmitting mechanism 16 by actuator 36, or to other torque transmitting mechanisms controlled by closed end variable bleed solenoids or similar devices.

At a time equal to t0, the fill phase initiates and control 22 commands actuator 38 to provide full pressure to torque transmitting mechanism 30. This is shown by the increase in the pressure commands of curve 110 between time t0 and time t1. During this time, the main pressure 114 drops as a result of the large fluid demands of the on-coming torque transmitting mechanism. The control pressure 116 decreases in response to the drop in the main pressure.

At time t1, the fill phase is ended and the trim phase begins. The commanded pressure signal from control 22 adjusts to an intermediate pressure value at time t2. At time t4, the apply phase begins. At time t4, control 22 commands full pressure thereby providing full engagement of the torque transmitting mechanism. Thus, the trim phase occurs between time t2 and time t4.

During the trim phase, vehicle operating conditions may arise that cause the transmission input speed to decrease below a predetermined desired transmission input speed while the temperature of the hydraulic fluid increases above a predetermined desired temperature level. The decrease in transmission input speed is shown by the portion of curve 112 between time t2 and t3 of FIG. 4. The decreased transmission input speed causes a drop in main pressure, as shown by the portion of curve 114 between times t2 and t3. The drop in main pressure causes a corresponding drop in control pressure, as shown by the portion of curve 116 between times t2 and t3. Thus, the decreased transmission input speed decreases the supply pressure to the torque transmitting mechanism.

Due to structural characteristics of closed end variable bleed solenoids and similar types of torque transmitting mechanism actuators, the drop in supply pressure may cause the actuator output pressure to destabilize and to actually increase, as shown by the portion of curve 118 beginning at about time t3. During such an event, the actuator output pressure may become uncontrollable until the main pressure returns to an acceptable level. The effects of this actuator behavior may become noticeable to the vehicle operator, for example in the form of a "rough" shift.

To "correct" the actuator behavior during a low transmission input speed/high fluid temperature event in the trim phase, clutch control 82 initiates a pressure command modifier 42. The unmodified pressure command that is provided by clutch control 82 to the actuator 36, 38 under normal conditions is designated as PC(i) in FIG. 2. Pressure command modifier 42 modifies the normal pressure command PC(i) if the transmission input speed and fluid temperature conditions are met. Pressure command modifier 42 outputs a modified pressure command PC(f) during such time as the transmission input speed and/or fluid temperature conditions are satisfied, or for a predetermined maximum period of time elapsed on the shift timer. The modified pressure command PC(f) is configured to stabilize the actuator output pressure to provide smoother engagement of the on-coming torque transmitting mechanism when a low transmission input speed/high fluid temperature event occurs.

Figure 3:
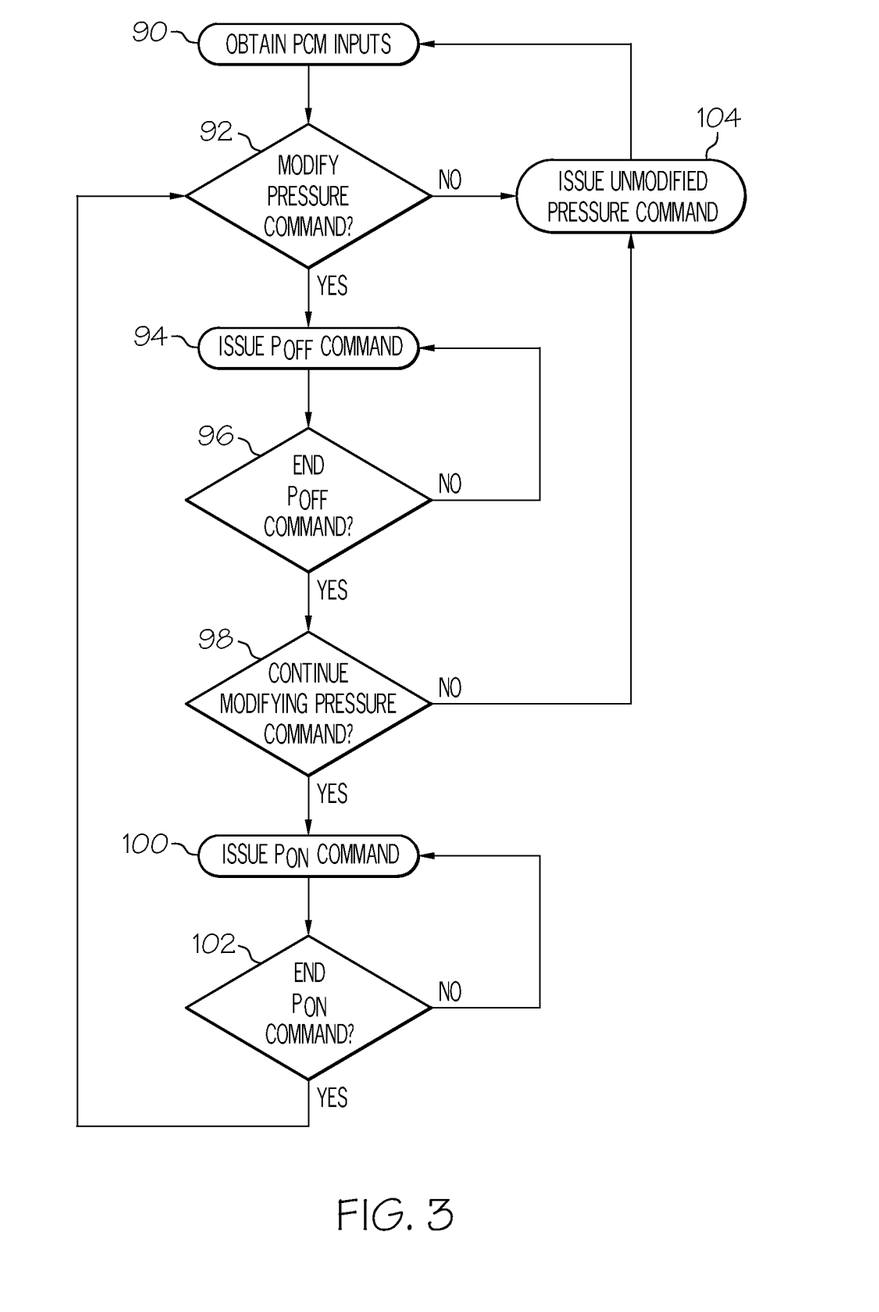
FIG. 3 is a simplified flow diagram illustrating operations executable by an electronic control to manage actuator output pressure.

FIG. 3 illustrates steps, operations or processes that are executable by computer programming logic of pressure command modifier 42, once it has been determined that a shift is in progress and the trim phase has been initiated. At block 90, pressure command modifier 42 obtains the current values of the inputs that it uses to determine whether it needs to initiate modification of, or continue modification of, the pressure command PC(i). These inputs include transmission input speed (TIS), fluid temperature (TEMP), and time elapsed on the shift timer, as discussed above. Pressure command modifier 42 then evaluates the current values of the inputs in view of the preset threshold values at block 92.

In the illustrated embodiment, the threshold values are as follows. For transmission input speed, the threshold value is selected from the range of about 300 to about 600 revolutions per minute, however, the controls 80, 82, 42 are capable of handling any threshold value selected from the broader range of about 0 to about 8192 rpm. For fluid temperature, the threshold is in the range of about 80 degrees Celsius to about 140 degrees Celsius, however, the controls 80, 82, 42 are capable of handling any threshold value selected from the broader range of about −256 c. to about 256 c. More particularly, in the illustrated embodiment, the threshold transmission input speed value is initially set at about 450-525 rpm, and the threshold fluid temperature value is initially set at about 100 degrees Celsius. For time elapsed, the threshold value is in the range of about 2.5 seconds after the pressure command modifier 42 begins modifying the pressure command. In other words, the pressure command modifier 42 will exit and return to normal clutch control if either the transmission input speed increases above the threshold transmission input speed value or the time elapsed exceeds the threshold time elapsed value.

If the transmission input speed is less than its threshold value and the sump fluid temperature is greater than its threshold value, then pressure command modifier 42 proceeds to block 94. If the threshold speed and temperature conditions are not met, then the normal pressure command PC(i) is issued at block 104. The transmission input speed and sump temperature inputs continue to be monitored at blocks 90-92 until the threshold conditions for executing pressure command modifier 42 are satisfied or the trim phase of the shift is completed.

At step 94, pressure command modifier 42 generates a modified pressure command PC(f) that commands zero or substantially zero pressure for a predetermined amount of time or until the transmission input speed recovers, allowing the actuator supply pressure to recover. In the illustrated embodiment, the "pressure off" PC(f) command is set to zero or substantially zero pressure for a period in the range of about 25 milliseconds. However, the duration of the zero PC(f) pressure command may longer or shorter. For instance, the duration of the pressure off PC(f) command may be selected from the range of up to about 100 milliseconds, although the pressure command modifier 42 is capable of handing any duration selected from the broader range of about zero to about 32 seconds.

After the time period for application of the zero pressure or "pressure off" PC(f) command has expired, as determined by block 96, then pressure command modifier 42 checks to see if it should continue to run at block 98. If the conditions that caused pressure command modifier 42 to execute have expired, or a predetermined amount of time has elapsed on the shift timer, then pressure command modifier 42 will return to normal clutch control and issue an unmodified pressure command at block 104.

If the conditions that caused pressure command modifier 42 to execute have not expired, and the predetermined amount of time for execution of modifier 42 has not elapsed on the shift timer, then pressure command modifier 42 will proceed to block 100. At block 100, pressure command modifier 42 generates a new modified pressure command PC(f) that commands a non-zero pressure or "pressure on" command for a predetermined amount of time or until the transmission input speed recovers. The pressure on PC(f) pressure command is generally equal to the trim pressure plus a predetermined offset. In the illustrated embodiment, the offset is in the range of about 7 kilopascals (kpa), however, the controls 80, 82, 42 are capable of handling any value selected from the range of about −4096 kpa to about 4096 kpa as the offset.

In the illustrated embodiment, the "pressure on" PC(f) command is issued for a period in the range of about 50 milliseconds. For instance, the duration of the pressure on PC(f) command may be selected from the range of up to about 100 milliseconds, although the pressure command modifier 42 is capable of handing any duration selected from the broader range of about zero to about 32 seconds. Also, while the pressure on PC(f) command is set to have a longer duration than the pressure off PC(f) command in the illustrated embodiment, in other embodiments, the pressure on and pressure off PC(f) commands may be set to the same duration or each may be set to shorter or longer durations.

After the time period for application of the pressure on PC(f) command has expired, as determined by block 102, then pressure command modifier 42 returns to block 92. The sequence of pressure off and pressure on PC(f) commands is repeated until block 92 or block 98 determines that it should no longer continue. At such time, normal clutch control resumes, and the unmodified pressure commands are issued at block 104.

FIG. 5 graphically illustrates an example of an application of pressure command modifier 42. The fill phase of control of a torque transmitting mechanism begins at time t0. The trim phase occurs between time t2 and time t4. The modified pressure command PC(f) is provided during at least a portion of the trim phase, as illustrated by curve 110'. The drop in transmission input speed is shown by the portion of curve 112 between time t1 and time t5. The cycling of the pressure off and pressure on PC(f) commands is shown by the portion of curve 110' between time t5 and time t6. In comparison to FIG. 4, the actuator output pressure 118 is substantially stabilized notwithstanding the drop in transmission input speed and corresponding drops in main pressure 114 and control pressure 116, from time t5 to time t6.

The present disclosure describes patentable subject matter with reference to certain illustrative embodiments. The drawings are provided to facilitate understanding of the disclosure, and may depict a limited number of elements for ease of explanation. Except as may be otherwise noted in this disclosure, no limits on the scope of patentable subject matter are intended to be implied by the drawings. Variations, alternatives, and modifications to the illustrated embodiments may be included in the scope of protection available for the patentable subject matter.

The invention claimed is:

1. A method of delivering fluid pressure from a fluid source to a torque transmitting mechanism by an actuator, the method comprising:
    delivering a first fluid pressure to the torque transmitting mechanism by the actuator during an initial phase of applying the torque transmitting mechanism,
    determining that the initial phase has ended, and
    delivering second, third, and fourth fluid pressures different from one another to the torque transmitting mechanism by the actuator in response to determining that the initial phase has ended.

2. The method of claim 1, wherein delivering the first fluid pressure to the torque transmitting mechanism by the actuator during the initial phase comprises delivering a non-zero fluid pressure to the torque transmitting mechanism by the actuator.

3. The method of claim 2, wherein delivering the non-zero fluid pressure to the torque transmitting mechanism by the actuator causes a main fluid pressure supplied by the fluid source to decrease.

4. The method of claim 1, wherein delivering the first fluid pressure to the torque transmitting mechanism by the actuator during the initial phase comprises delivering the first fluid pressure to the torque transmitting mechanism prior to initiating a trim phase of applying the torque transmitting mechanism.

5. The method of claim 4, wherein delivering the second, third, and fourth fluid pressures to the torque transmitting mechanism by the actuator comprises delivering the second, third, and fourth fluid pressures to the torque transmitting mechanism by the actuator during the trim phase.

6. The method of claim 5, wherein delivering the second, third, and fourth fluid pressures to the torque transmitting mechanism by the actuator during the trim phase comprises delivering the third and fourth fluid pressures to the torque transmitting mechanism by the actuator based on a monitored value of (i) an input speed of a transmission and (ii) a temperature of fluid supplied by the fluid source.

7. The method of claim 6, wherein delivering the third and fourth fluid pressures to the torque transmitting mechanism by the actuator based on the monitored value of the input speed of the transmission and the temperature of fluid supplied by the fluid source comprises delivering the third and fourth fluid pressures to the torque transmitting mechanism by the actuator if (i) the monitored value of the input speed of the transmission is below a predetermined threshold and (ii) the monitored value of the temperature of fluid supplied by the fluid source is above a predetermined threshold.

8. The method of claim 1, wherein the second fluid pressure is a non-zero fluid pressure.

9. The method of claim 8, wherein the third fluid pressure is a zero or substantially zero fluid pressure.

10. The method of claim 9, wherein the fourth fluid pressure is a non-zero fluid pressure greater than the second fluid pressure.

11. The method of claim 10, wherein delivering the second, third, and fourth fluid pressures to the torque transmitting mechanism by the actuator comprises delivering (i) the second fluid pressure to the torque transmitting mechanism prior to delivering the third fluid pressure to the torque transmitting mechanism and (ii) the third fluid pressure to the torque transmitting mechanism prior to delivering the fourth fluid pressure to the torque transmitting mechanism.

12. The method of claim 1, wherein delivering the second, third, and fourth fluid pressures to the torque transmitting mechanism by the actuator comprises delivering the second, third, and fourth fluid pressures to the torque transmitting mechanism by the actuator during a trim phase of applying the torque transmitting mechanism that occurs after the initial phase has ended.

13. The method of claim 12, further comprising (i) determining that the trim phase has ended, and (ii) delivering a fifth fluid pressure to the torque transmitting by the actuator in response to determining that the trim phase has ended.

14. The method of claim 13, wherein delivering the fifth fluid pressure to the torque transmitting mechanism by the actuator comprises delivering the fifth fluid pressure to the torque transmitting mechanism by the actuator during an apply phase of applying the torque transmitting mechanism.

15. The method of claim 14, wherein the initial phase, the trim phase, and the apply phase are discrete phases of applying the torque transmitting mechanism.

16. The method of claim 13, wherein the fifth fluid pressure is associated with full application of the torque transmitting mechanism.

17. The method of claim 1, wherein delivering the second, third, and fourth fluid pressures to the torque transmitting mechanism by the actuator comprises delivering repeating third and fourth fluid pressures to the torque transmitting mechanism based on a monitored value of (i) an input speed of a transmission and (ii) a temperature of fluid supplied by the fluid source.

18. The method of claim 17, wherein delivering repeating third and fourth fluid pressures to the torque transmitting mechanism based on the monitored value of the input speed of the transmission and the temperature of fluid supplied by the fluid source comprises delivering repeating third and fourth fluid pressures to the torque transmitting mechanism if (i) the monitored value of the input speed of the transmission is below a predetermined threshold and (ii) the monitored value of the temperature of fluid supplied by the fluid source is above a predetermined threshold.

19. The method of claim 1, wherein the torque transmitting mechanism is a torque converter clutch.

* * * * *